Aug. 7, 1951 G. SPRY 2,563,196

TRANSDUCER CHUCK AND STYLUS

Filed June 26, 1946

INVENTOR.
GEORGE SPRY

BY Francis J. Klempay

ATTORNEY.

Patented Aug. 7, 1951 2,563,196

UNITED STATES PATENT OFFICE 2,563,196

TRANSDUCER CHUCK AND STYLUS

George Spry, Conneaut, Ohio, assignor to The Astatic Corporation, Conneaut, Ohio, a corporation of Ohio Application June 26, 1946, Serial No. 679,342

1 Claim. (Cl. 274—38)

This invention relates to the art of transcribing sound impulses from the surface grooves of record tablets and more specifically with electro-mechanical transducers, piezo-electric apparatus for example, and with impulse gathering styli employed as driving means for such apparatus.

Heretofore, two general classes of styli or "needles" have been commonly employed; those which are made of relatively inexpensive and easily destructible material and hence intended to be discarded after a short period of usefulness, and those which include a wearing tip of precious metal or precious gem and therefore are intended to serve for longer periods of time.

Associated with the above mentioned expendable styli and/or "semi-permanent" styli there are, in general use, two types of apparatus for attaching the styli to the transducer device associated therewith. The first of these attaching devices is the conventional chuck having a stylus receiving recess and associated retaining screw, and the second is the permanently attached rod or wire "drive-pin" to which the stylus is normally attached by soldering.

Both of these stylus attaching means incorporate certain undesirable or inefficient characteristics, several of which are expeditiously eliminated by the application of the principles of the present invention. The "chuck and set screw" method referred to above has the desirable property of permitting easy removal and replacement of styli without the use of tools but its practice necessitates the use of a considerable bulk of material interposed between the stylus and the transducer and this mass consequently possesses considerable inertia which must be overcome by each successive vibration impulse in its path from record to transducer. Thus, it will be understood that any reduction in the mass of the chuck and stylus attaching means will result in an improved response character in the apparatus and in proportionally reduced record and stylus wear.

In an effort to provide a stylus-transducer connection possessing minimum mass and inertia the expedient of soldering has been resorted to for connecting the wire shank of a stylus to the metal driver-rod of the transducer. In applications of this sort it is necessary to employ soldering irons or other heaters and the stylus replacement or installation operation is thus removed from the field of amateur activity and assumes the proportions of a professional servicing task. Also, it has been discovered that the application of excessive heat to the crystal of a pick-up cartridge results in destruction of the crystal element and such accidental application of heat frequently accompanies an attempt to replace a stylus of the solder-secured type. The present invention aims to eliminate such accidental impairment of vital operating parts.

As is well known, in the art of sound reproduction, certain physical characteristics must be embodied in a stylus so that proper and efficient transmission of record vibrations therethrough is not impaired either by the inclusion of excessive mass, as mentioned above, or by the interposition of unsuitable conductor media in the path of such vibrations. Also, it has been found that a certain degree of flexibility or compliance must be incorporated in the stem or shank of a stylus to assure optimum coaction between the playing tip of the latter and the groove of the record disk. Vertical compliance, that is to say, flexibility in a plane normal to the surface of the record disk, is essential in permitting the playing tip of the stylus to properly engage the sound groove of the disk at all times and to overcome the operational condition commonly known as "pinch-effect."

A degree of lateral compliance, flexibility in a plane parallel the record surface, is desirable in order to minimize record wear and to permit accurate following of the record groove by the stylus tip.

Both vertical and horizontal compliance are provided by the various embodiments of the present invention in a novel manner hereinafter to be more fully described.

Further, it is well understood in the art that various crystal transducer devices may be classified as being of "high-output" type, wherein the connection between record and crystal is relatively rigid and wherein any given impulse at the stylus point will generate a relatively high voltage reaction in the crystal, or of "low-output" type wherein a more flexible connection exists between record and crystal and wherein lower needle pressure is required to accomplish proper tracking and wherein there is displayed an attendant reduction in voltage output. Either of these two types of styli may be employed in connection with any given type of crystal by applying the principles of the present invention.

It is therefore a prime object of the present invention to provide means for attaching a stylus to a transducer unit in such manner that it may be readily disengaged therefrom without the use of cumbersome tools. Another object is the provision of such attaching means which possess the desirable operational characteristics of the direct-connected stylus type of attachment while yet including the features of easy replacement usually associated with the bulkier set-screw type of mounting. Yet another object is the provision of means for making a transducer unit readily receptive to the installation of styli of various forms, each possessing various operational character, the use of which may be dictated by the character of the transducer unit employed.

Yet another object is the provision of a stylus and a stylus holding means which are extremely economical to manufacture and which are designed in a manner to permit their fabrication by quantity production methods as by wire benders, broaches, and automatic screw machines, for example.

These and other objects and advantages will be apparent upon a study of the attached drawing and detailed description wherein there are disclosed several preferred embodiments of the invention. These disclosures should be considered as illustrative only as obviously many departures may be made therefrom, by one skilled in the art, without departing from the spirit of the invention. Reference to the appended claim should therefore be had in determining the scope of the invention.

Figure 1:
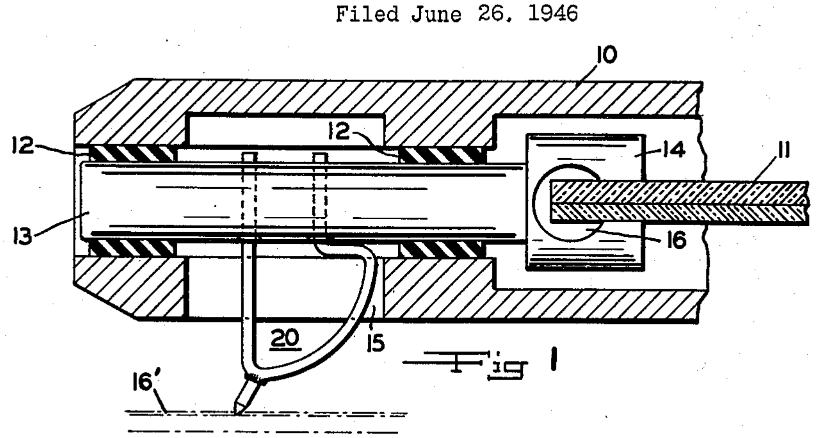
Figure 1 is a fragmentary sectional view of a piezo-electrical transducer incorporating a stylus and driver-rod constructed according to the principles of the present invention.

Referring now more in detail to the drawing, wherein like numerals indicate like parts through the views, the reference numeral 10 indicates the case or cartridge housing the piezo-electric crystal 11 and the rubber bearings 12. Journaled in bushings 12 is the driver-rod 13 which is provided with a bifurcated end portion 14 for attachment to the crystal 11 in a manner well known in the art. A record engaging stylus indicated generally by the numeral 20 is attached to rod 13 near its mid-portion and is accommodated in window 15, of case 10, from which it protrudes to contact the surface of record tablet 16′. Window 15 is of proportions ample to permit unrestricted motion of stylus 20 about the neutral axis of rod 13 and it will thus be apparent that motion imparted to the former will be transmitted via the latter to the crystal 11.

Figure 2:
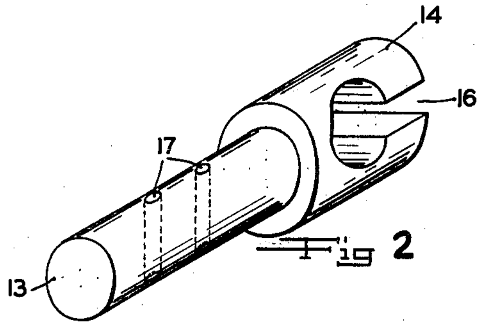
Figure 2 is a perspective view of a driver-rod and stylus holder embodying the elements of the present invention in its preferred form.
Figures 6, 7:
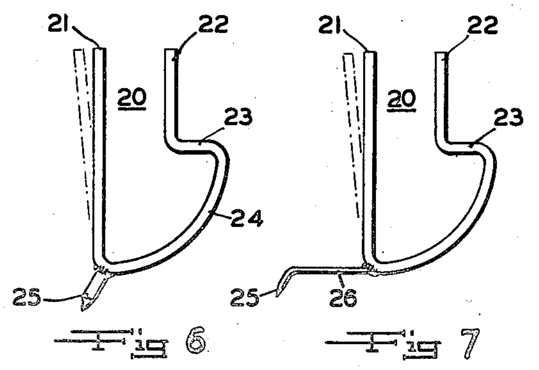
Figure 6 is a view of a stylus of the "high-output" type designed to be secured in the driver-rod of Figure 2 and is also illustrated in operating position in Figure 1; and, Figure 7 is a view of a stylus of the "low-output" type which may be interchangeably attached to the driver-arm of Figure 2.

The detailed structure of the parts 13 and 20 is illustrated in Figures 2 and 6 respectively and attention is directed to the former for a showing of driver-rod 13 and its pertinent features. The larger end 14 is provided, of sufficient length and diameter to permit the machining or broaching of the transverse slot 16 which is adaptable to receive the forward end of crystal 11. By the utilization of an automatic screw machine, for example, the more slender portion 13 is formed integrally with 14 from a single piece of parent material and the two transverse holes 17 are provided, piercing rod 13 at an angle 90° removed from slot 16.

Thus is provided a completed driver-rod element which may now be assembled in a manner illustrated in Figure 1 for the reception of either of the styli of Figure 6 or Figure 7.

Observation of Figure 6 will show the preferred form in which a "high-output" stylus is constructed, 20 being the stylus in general, formed of a single bent wire element having its ends 21 and 22 lying but slightly divergent from a parallel relation and having the stop 23 formed near the base of leg 22 to limit the extent of insertion thereof into holes 17 of the holder of Figure 2. A curved flexing portion 24 is provided in the body of the wire below and between legs 21 and 22 and near the lowest part of the curve 24 a record engaging tip 25 is attached to the wire of the stylus in any suitable permanent manner as by soldering or welding, for example. This last mentioned operation of soldering is not to be confused with that referred to above as the latter is effected as a step in the assembling of the stylus and is completed before stylus is inserted into drive rod.

The "low-output" form of stylus illustrated in Figure 7 embodies the same essential legs 21 and 22, the stop 23 and the curved portion 24 as that shown in Figure 6 and is adapted to be received by the driver-rod in the same manner as illustrated in Figure 1. However, it does include the additional flexing element 26 which is permanently attached to flexing portion 24 and which carries at its forward free end the record engaging tip 25.

Figures 3, 5:
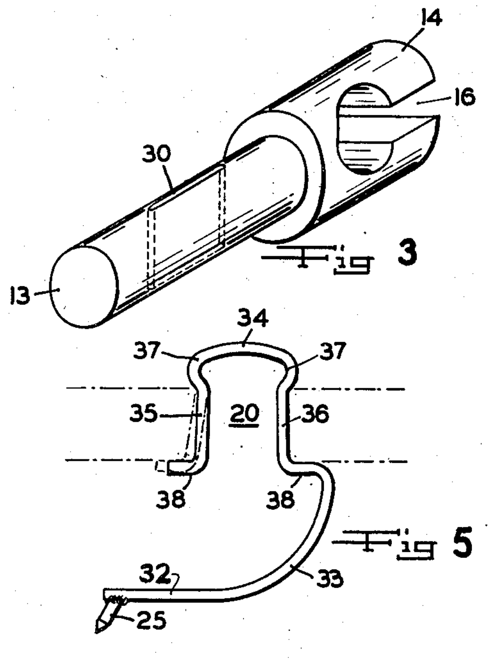
Figure 3 is a perspective view of a modified form of the driver-rod of Figure 2.
Figure 5 is a view of a stylus of the "low-output" type adapted to be secured in the driver-rod of Figure 3.
Figure 4:
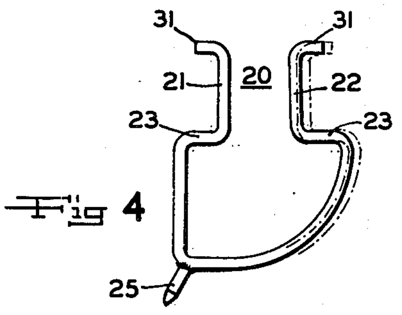
Figure 4 is a view of a stylus of the "high-output" type adapted to be secured in the driver-rod of Figure 3.

A modification of the driver-rod of Figure 2 is shown in Figure 3, the stylus receiving holes 17 of the former being replaced by the transverse slot 30 which is provided to receive either of the styli of Figures 4 or 5.

The alternate form of stylus illustrated in Figure 4 is provided, for insertion into slot 30 of Figure 3, with upwardly extending legs 21 and 22, limiting stops 23 formed in each leg, and short hook portions 31 at each of its leg extremities. Flexing portion 24 again applies a spreading force to legs 21 and 22 as in the modification of Figure 6.

Figure 5 illustrates a second modified form of stylus for insertion in the stylus-holder of Figure 3 and is also formed of a single piece of wire but in such manner that it has the "low-output" characteristic of the two part stylus of Figure 7. It will be noted that the record engaging tip 25 of Figure 5 is secured upon the free end 32 of the flexing portion 33 which flexing portion is not required to exert any retention forces as in the formerly described embodiments. An upwardly disposed spring portion 34 is formed in the body of the wire to urge the downwardly extending legs 35 and 36 against the respective sides of the embracing slot 30 of the holder of Figure 3 and the upper stops 37 and the lower stops 38 provide means to prevent vertical motion of the stylus with relation to the holder.

The record engaging tip 25 referred to in all modifications may be of metallic alloy which admits of attachment by soldering or welding; or it may be of such material as sapphire or diamond in which case a metal cap may be provided to retain the gem tip and to afford a solderable material for attachment to the metallic wire of the stylus of the invention.

In applying the principles of my invention I have found that considerable economies in the production of efficient driving apparatus for record transcribing pick-ups may be effected. Heretofore, it has been common practice to employ especially fabricated chucks or driver-rods made of die cast metal alloys or of complex metal stampings for accomplishing the results achieved by the relatively simple and inexpensive turned rod which I provide. Substantial savings in time and material may be effected by making driver-rod 13 of the present invention from readily procurable round metal rod in automatic machines of the screw-machine type, for example.

The wire styli of the present invention may be readily fabricated in wire bending machines which usually operate in an automatic manner with substantial savings of expensive manual effort. The sole remaining manual operation of assembly is the attaching of record engaging tip 25 which operation, however, may be expedited by the use of various holders, jigs, etc., as is well known.

It should now be apparent that new and useful improvements in phonograph styli and styli holders have thus been provided which accomplish in a novel manner the objects initially set out. In determining the scope of the present invention reference should be had to the appended claim.

What I claim is:

An electro-mechanical transducer stylus made of bent wire having an end, a substantially vertical very straight leg portion, a U-shaped spring portion, a short horizontal stop portion adapted to rest against a holder a relatively short vertical straight leg portion lying parallel with and in spaced relation to said long straight leg portion and terminating in the horizontal plane of the first mentioned end, and a record engaging tip attached to said U-shaped spring portion at its juncture with first said leg portion the axis of said tip being angularly disposed with respect to the axis of said first mentioned leg portion.

GEORGE SPRY.

REFERENCES CITED

The following references are of record in the file of this patent:

UNITED STATES PATENTS

| Number | Name | Date |
|---|---|---|
| 1,260,586 | Smith | Mar. 26, 1918 |
| 1,508,163 | Clifton | Sept. 9, 1924 |
| 1,639,847 | Nightingall | Nov. 22, 1927 |
| 2,385,945 | Schmidt | Oct. 2, 1945 |
| 2,432,444 | Roberts | Dec. 9, 1947 |

FOREIGN PATENTS

| Number | Country | Date |
|---|---|---|
| 503,240 | France | Mar. 13, 1920 |